(12) United States Patent
Lin

(10) Patent No.: US 6,270,097 B1
(45) Date of Patent: Aug. 7, 2001

(54) FOLDABLE SKATEBOARD DEVICE

(76) Inventor: Chen-Hsiung Lin, 58, Ma Yuan West St., Taichung (TW)

( * ) Notice: Subject to any disclaimer, the term of this patent is extended or adjusted under 35 U.S.C. 154(b) by 0 days.

(21) Appl. No.: 09/608,690

(22) Filed: Jun. 28, 2000

(51) Int. Cl.$^7$ .................................................. B62K 15/00
(52) U.S. Cl. .................................... 280/87.05; 280/87.041
(58) Field of Search ........................... 280/87.01, 87.021, 280/87.041, 87.042, 87.05, 14.28; 403/68, 71, 92, 93, 325

(56) References Cited

U.S. PATENT DOCUMENTS

| | | | |
|---|---|---|---|
| 1,658,068 | * | 2/1928 | White ................................ 280/87.041 |
| 2,170,978 | * | 8/1939 | Smith .................................. 280/87.05 |
| 3,026,161 | * | 3/1962 | Mickelson ............................... 403/68 |
| 3,126,189 | * | 3/1964 | Van Syoc, Sr. ........................... 403/68 |
| 3,547,054 | * | 12/1970 | Caldwell ................................. 403/93 |
| 4,707,884 | * | 11/1987 | Chang .............................. 280/87.041 |
| 5,520,141 | * | 5/1996 | Lutz ....................................... 403/93 |
| 6,012,539 | * | 1/2000 | Patmont ........................... 280/87.041 |
| 6,120,044 | * | 9/2000 | Tsai .................................... 280/87.05 |
| 6,158,751 | * | 12/2000 | Wu et al. .......................... 280/87.041 |

FOREIGN PATENT DOCUMENTS

| | | | | |
|---|---|---|---|---|
| 26760 | * | 3/1924 | (FR) ................................. 280/87.041 |
| 596064 | * | 10/1925 | (FR) .................................. 280/87.05 |
| 185998 | * | 9/1922 | (GB) .................................. 280/87.05 |

* cited by examiner

*Primary Examiner*—Frank Vanaman

(57) ABSTRACT

A foldable skateboard device has a board, a holding seat disposed on a front portion of the board, a down tube inserted in the holding seat, a front tube connected to the down tube, a front wheel disposed on a bottom of the front tube, and a rear wheel disposed on a rear end of the board. The down tube has an annular flange. The holding seat has a hollow connection portion receiving a lower end of the down tube, a recess, and an upper confining portion. A pivot pin fastens the hollow connection portion of the holding seat and the lower end of the down tube together. A sleeve is disposed on a middle portion of the down tube. An elastic element encloses the down tube.

1 Claim, 5 Drawing Sheets

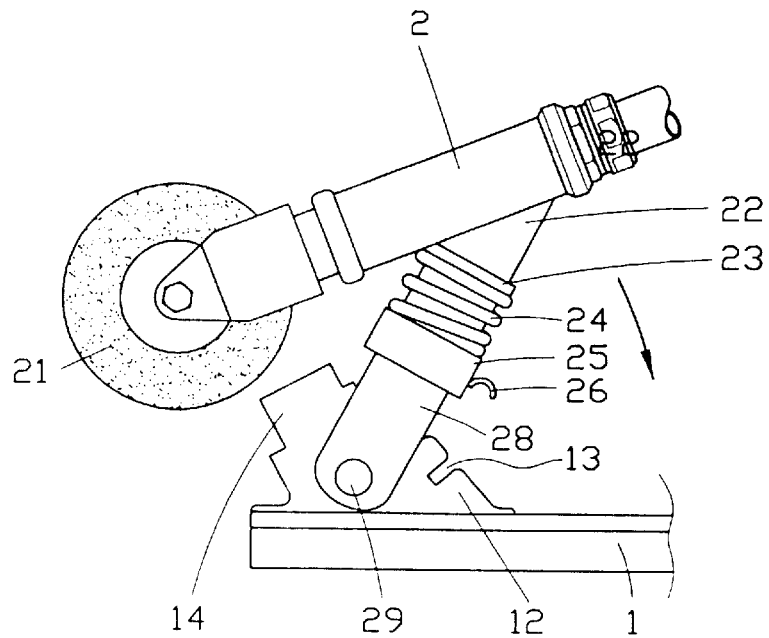
F I G. 5
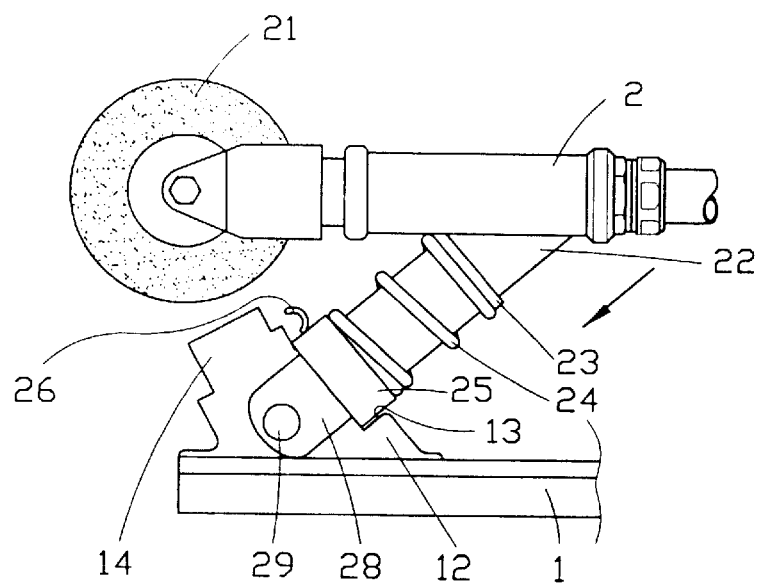
F I G. 6

FOLDABLE SKATEBOARD DEVICE

BACKGROUND OF THE INVENTION

The present invention relates to a foldable skateboard device. More particularly, the present invention relates to a foldable skateboard device which can be folded easily.

A conventional skateboard device cannot be controlled by hand. If a front tube and a handle bar are added on the conventional skateboard device so that the conventional skateboard device can be controlled by hand, the front tube cannot be folded.

SUMMARY OF THE INVENTION

An object of the present invention is to provide a foldable skateboard device which can be folded easily.

Accordingly, a foldable skateboard device comprises a board, a holding seat disposed on a front portion of the board, a down tube inserted in the holding seat, a front tube connected to the down tube, a front wheel disposed on a bottom of the front tube, and a rear wheel disposed on a rear end of the board. The down tube has an annular flange. The holding seat has a hollow connection portion receiving a lower end of the down tube, a recess, and an upper confining portion. The hollow connection portion of the holding seat has two grooves. A pivot pin fastens the hollow connection portion of the holding seat and the lower end of the down tube together. A sleeve is disposed on a middle portion of the down tube. An elastic element encloses the down tube. The elastic element is disposed between the sleeve and the annular flange. The down tube passes through the sleeve. The upper confining portion of the holding seat engages with the sleeve. A hook-shaped bar is disposed on the sleeve. When the hook-shaped bar is pressed upward, the sleeve disengages from the upper confining portion of the holding seat. An upper portion of the front tube is moved downward until the hook-shaped bar is inserted in the recess of the holding seat. When the sleeve and the elastic element are pressed upward, the upper portion of the front tube is moved downward until the sleeve engages with the upper confining portion of the holding seat.

BRIEF DESCRIPTION OF THE DRAWINGS

FIG. 5 is a schematic view illustrating a third operation of a foldable skateboard device of a preferred embodiment in accordance with the present invention;

FIG. 6 is a schematic view illustrating a fourth operation of a foldable skateboard device of a preferred embodiment in accordance with the present invention.

DETAILED DESCRIPTION OF THE INVENTION

Figure 1:
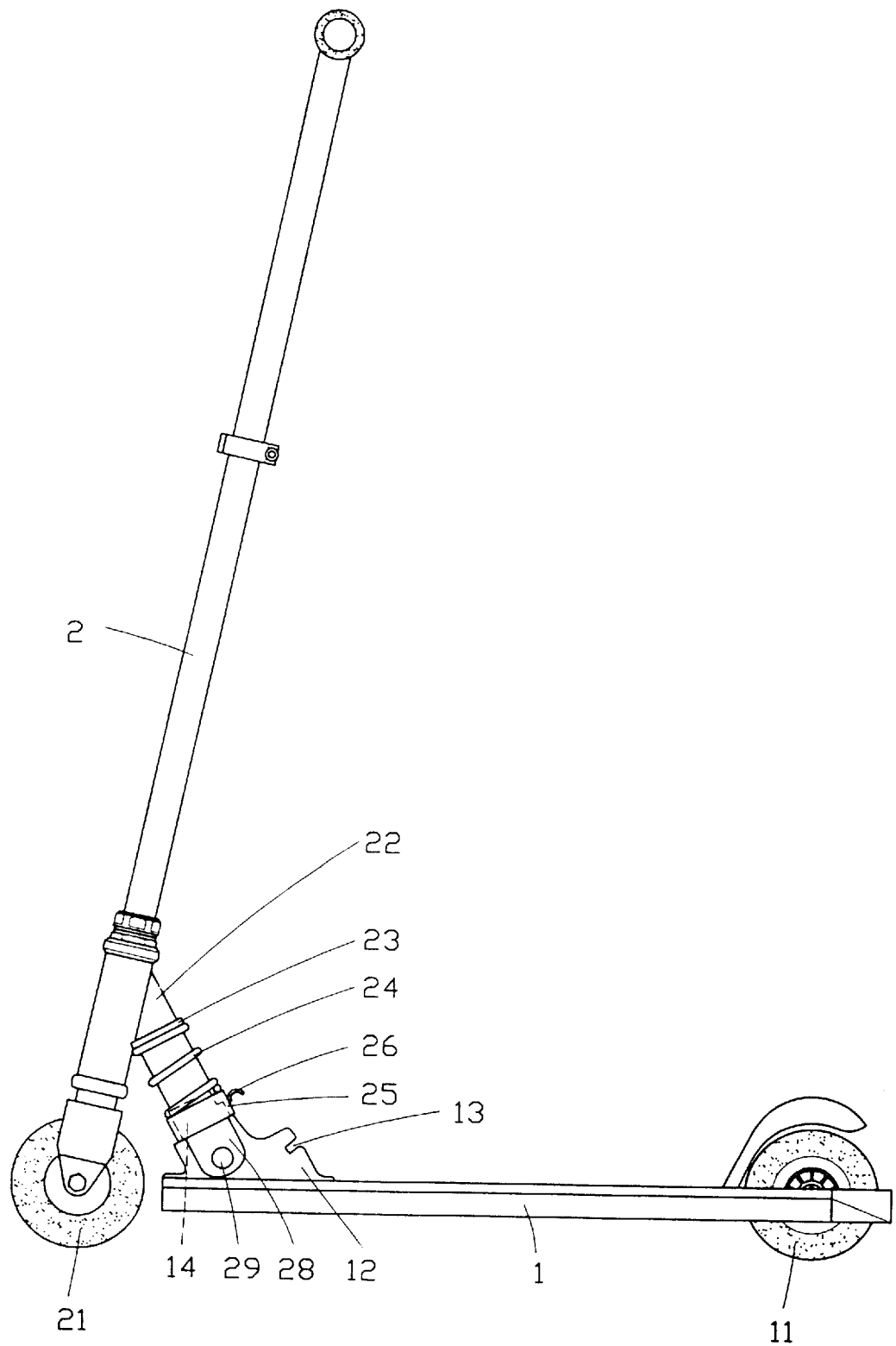
FIG. 1 is an elevational assembly view of a foldable skateboard device of a preferred embodiment in accordance with the present invention.
Figure 2:
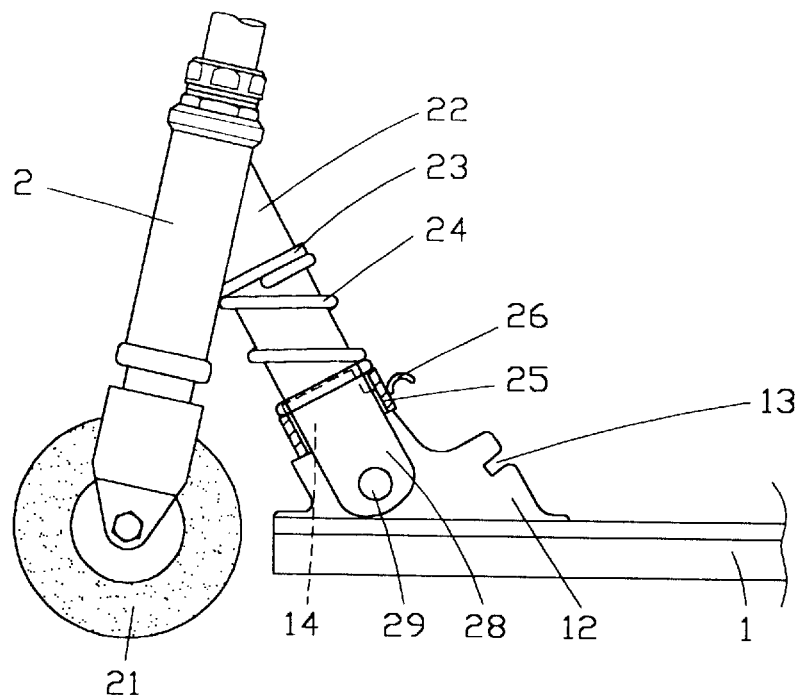
FIG. 2 is a partially elevational view of a foldable skateboard device of a preferred embodiment in accordance with the present invention.
Figure 2A:
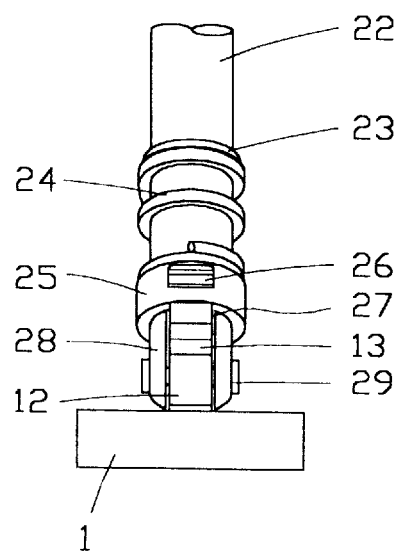
FIG. 2A is a partially perspective view of a foldable skateboard device of a preferred embodiment in accordance with the present invention.
Figure 3:
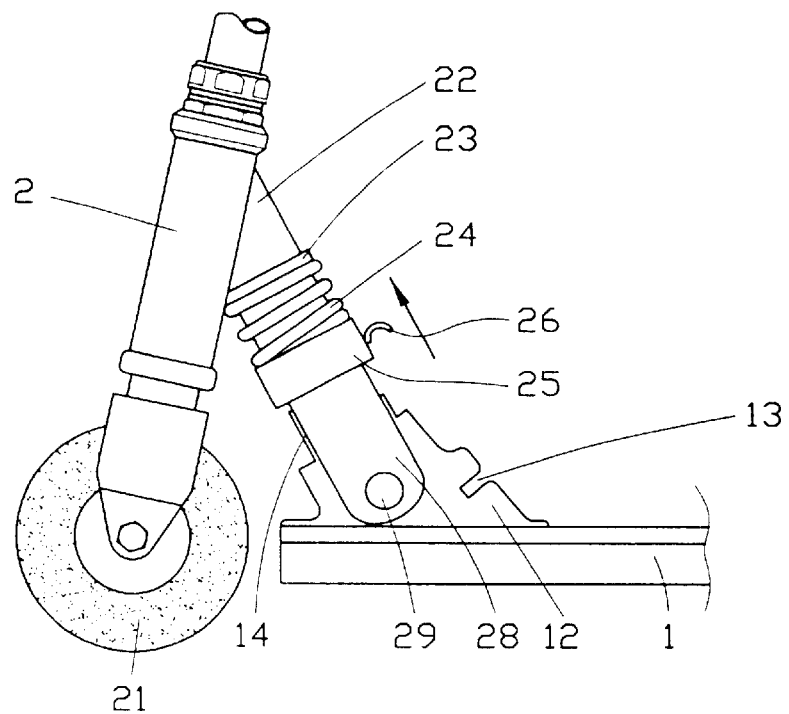
FIG. 3 is a schematic view illustrating a first operation of a foldable skateboard device of a preferred embodiment in accordance with the present invention.

Referring to FIGS. 1 to 7, a foldable skateboard device comprises a board 1, a holding seat 12 disposed on a front portion of the board 1, a down tube 22 inserted in the holding seat 12, a front tube 2 connected to the down tube 22, a front wheel 21 disposed on a bottom of the front tube 2, and a rear wheel 11 disposed on a rear end of the board 1.

The down tube 22 has an annular flange 23.

The holding seat 12 has a hollow connection portion 28 receiving a lower end of the down tube 22, a recess 13, and an upper confining portion 14.

The hollow connection portion 28 of the holding seat 12 has two grooves 27.

A pivot pin 29 fastens the hollow connection portion 28 of the holding seat 12 and the lower end of the down tube 22 together.

A sleeve 25 is disposed on a middle portion of the down tube 22. An elastic element 24 encloses the down tube 22. The elastic element 24 is disposed between the sleeve 25 and the annular flange 23.

The upper confining portion 14 of the holding seat 12 engages with the sleeve 25.

A hook-shaped bar 26 is disposed on the sleeve 25.

Figure 4:
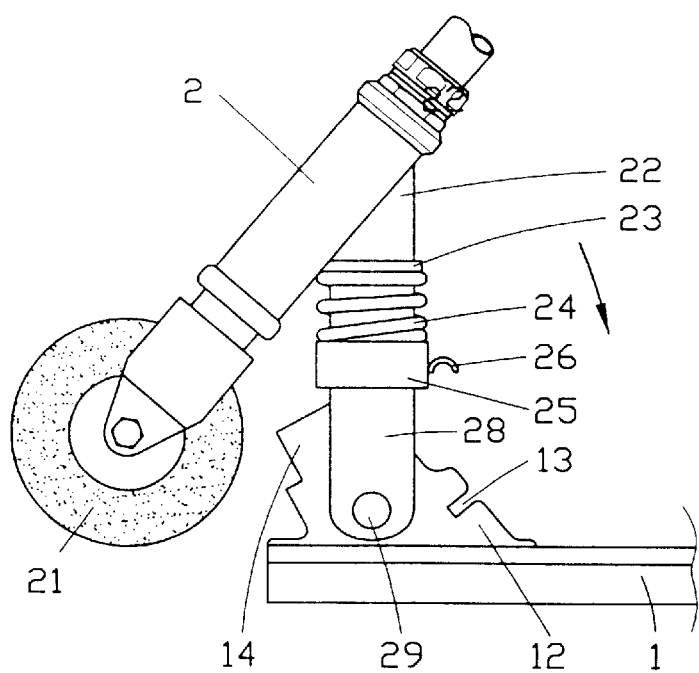
FIG. 4 is a schematic view illustrating a second operation of a foldable skateboard device of a preferred embodiment in accordance with the present invention.
Figure 7:
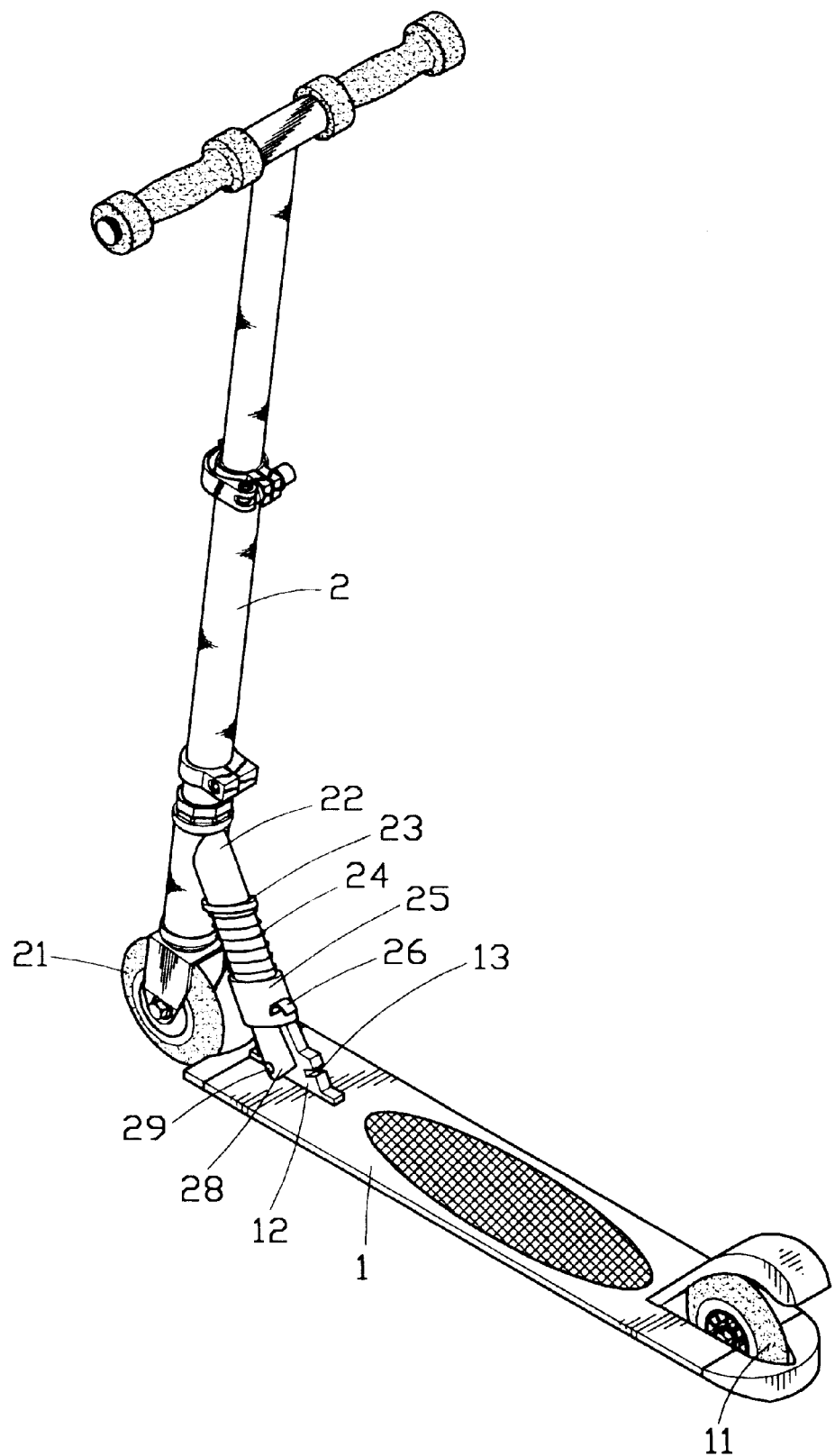
FIG. 7 is a perspective assembly view of a foldable skateboard device of a preferred embodiment in accordance with the present invention.

Referring to FIG. 3 again, the hook-shaped bar 26 is pressed upward. The sleeve 25 disengages from the upper confining portion 14 of the holding seat 12. Then an upper portion of the front tube 2 is moved downward (as shown in FIG. 4).

Referring to FIGS. 5 and 6, the upper portion of the front tube 2 is moved downward until the hook-shaped bar 26 is inserted in the recess 13 of the holding seat 12.

When the sleeve 25 and the elastic element 24 are pressed upward, the upper portion of the front tube 2 is moved downward until the sleeve 25 engages with the upper confining portion 14 of the holding seat 12.

The invention is not limited to the above embodiment but various modification thereof may be made. Further, various changes in form and detail may be made without departing from the scope of the invention.

I claim:

1. A foldable skateboard device comprises:

a board, a holding seat disposed on a front portion of the board, a down tube inserted in the holding seat, a front tube connected to the down tube, a front wheel disposed on a bottom of the front tube, and a rear wheel disposed on a rear end of the board, the down tube having an annular flange, the holding seat having a hollow connection portion receiving a lower end of the down tube, a recess, and an upper confining portion, a pivot pin fastening the hollow connection portion of the holding seat and the lower end of the down tube together, a sleeve disposed on a middle portion of the down tube, an elastic element enclosing the down tube, the elastic element disposed between the sleeve and the annular flange, the upper confining portion of the holding seat engaging with the sleeve, a hook-shaped bar disposed on the sleeve.

* * * * *